(12) United States Patent
Abe

(10) Patent No.: US 11,448,924 B2
(45) Date of Patent: Sep. 20, 2022

(54) LIGHT CONTROL DEVICE COMPRISING A TRANSPARENT ADHESIVE LAYER COVERING A SHEET EDGE FACE OF A LIGHT CONTROL SHEET AND METHOD FOR PRODUCING THE SAME

(71) Applicant: TOPPAN PRINTING CO., LTD., Tokyo (JP)

(72) Inventor: Sohei Abe, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/188,241

(22) Filed: Mar. 1, 2021

(65) Prior Publication Data
US 2021/0208439 A1 Jul. 8, 2021

Related U.S. Application Data

(63) Continuation of application No. PCT/JP2019/033434, filed on Aug. 27, 2019.

(30) Foreign Application Priority Data

Aug. 27, 2018 (JP) ............................. JP2018-158481

(51) Int. Cl.
*G02F 1/1343* (2006.01)
*G02F 1/1339* (2006.01)
*G02F 1/1334* (2006.01)

(52) U.S. Cl.
CPC ...... *G02F 1/13439* (2013.01); *G02F 1/13345* (2021.01); *G02F 1/13392* (2013.01); *G02F 1/13398* (2021.01); *G02F 2202/28* (2013.01)

(58) Field of Classification Search
CPC ............ G02F 1/13345; G02F 1/13398; G02F 1/13392
See application file for complete search history.

(56) References Cited

U.S. PATENT DOCUMENTS

2002/0112875 A1* 8/2002 Hase .................. C08L 23/0815
174/120 C
2007/0019148 A1* 1/2007 Ueda .................. G02F 1/13392
349/155
(Continued)

FOREIGN PATENT DOCUMENTS

CN 103278976 A * 9/2013 ........... G02F 1/1343
CN 103412429 A * 11/2013 ........... G02F 1/1334
(Continued)

OTHER PUBLICATIONS

International Search Report dated Oct. 15, 2019 in PCT/JP2019/033434, filed Aug. 27, 2019, (with English Translation).
(Continued)

*Primary Examiner* — Paul C Lee
(74) *Attorney, Agent, or Firm* — Oblon, McClelland, Maier & Neustadt, L.L.P.

(57) ABSTRACT

A light control device includes a first transparent coating substrate having a first bonding surface, a second transparent coating substrate having a second bonding surface, a light control sheet located between the first and second bonding surfaces, and a transparent adhesive layer that joins the first and second bonding surfaces together around the light control sheet. The light control sheet includes a first transparent electrode film, a second transparent electrode film, and a liquid crystal layer including a liquid crystal composition that fills space between the first transparent electrode film and the second transparent electrode film. The light control sheet has a sheet edge face, and the transparent adhesive layer covers the sheet edge face and has a water absorption rate of 2% or less in accordance with a method of JIS K 7209:2000 A.

20 Claims, 4 Drawing Sheets

(56) References Cited

U.S. PATENT DOCUMENTS

| | | | | |
|---|---|---|---|---|
| 2008/0196816 A1* | 8/2008 | Lewno | ................... | B60J 1/1884 |
| | | | | 156/99 |
| 2015/0286079 A1* | 10/2015 | Sternchuss | .......... | C03C 17/3435 |
| | | | | 349/139 |
| 2016/0082812 A1* | 3/2016 | Okuda | .............. | B32B 17/10761 |
| | | | | 49/323 |

FOREIGN PATENT DOCUMENTS

| | | | |
|---|---|---|---|
| CN | 106997116 A * | 8/2017 | ......... G02F 1/13718 |
| JP | H01-186911 A | 7/1989 | |
| JP | H02-024630 A | 1/1990 | |
| JP | 2005-017860 A | 1/2005 | |
| JP | 2011-090213 A | 5/2011 | |
| JP | 2014-182287 A | 9/2014 | |
| JP | 2017-198726 A | 11/2017 | |
| JP | 2018-040883 A | 3/2018 | |
| WO | WO 2017/099167 A1 | 6/2017 | |
| WO | WO 2018/038743 A1 | 3/2018 | |
| WO | WO-2018223902 A1 * | 12/2018 | ........ G02F 1/133711 |

OTHER PUBLICATIONS

Extended European Search Report dated Sep. 14, 2021 in corresponding European Patent Application No. 19855617.7, 11 pages.

* cited by examiner (a)

(b)

LIGHT CONTROL DEVICE COMPRISING A TRANSPARENT ADHESIVE LAYER COVERING A SHEET EDGE FACE OF A LIGHT CONTROL SHEET AND METHOD FOR PRODUCING THE SAME

CROSS-REFERENCE TO RELATED APPLICATIONS

The present application is a continuation of International Application No. PCT/JP2019/033434, filed Aug. 27, 2019, which is based upon and claims the benefits of priority to Japanese Application No. 2018-158481, filed Aug. 27, 2018. The entire contents of all of the above applications are incorporated herein by reference.

BACKGROUND OF THE INVENTION

Field of the Invention

The present invention relates to a light control device including a light control sheet and a method for producing the same.

Discussion of the Background

A light control sheet includes a first electrode layer, a second electrode layer, and a liquid crystal layer located between the first and second electrode layers. The first electrode layer and the second electrode layer allow visible light to be transmitted therethrough. The liquid crystal layer includes a polymer network and a liquid crystal composition that fills voids of the polymer network. Changing a voltage applied across the electrode layers alters a light transmittance of the liquid crystal layer, and in turn alters a light transmittance of the light control sheet (see, e.g., JP 2018-40883 A).

SUMMARY OF THE INVENTION

According to an aspect of the present invention, a light control device includes a first transparent coating substrate having a first bonding surface, a second transparent coating substrate having a second bonding surface, a light control sheet located between the first bonding surface and the second bonding surface, and a transparent adhesive layer that joins the first bonding surface and the second bonding surface together around the light control sheet. The light control sheet includes a first transparent electrode film including a first electrode layer formed on a first support film which is joined to the first bonding surface via a first transparent adhesive, a second transparent electrode film including a second electrode layer formed on a second support film which is joined to the second bonding surface via a second transparent adhesive, and a liquid crystal layer including a liquid crystal composition that fills space between the first transparent electrode film and the second transparent electrode film. The light control sheet has a sheet edge face formed by an edge face of the first electrode layer, an edge face of the second electrode layer, and an edge face of the liquid crystal layer. The transparent adhesive layer covers the sheet edge face and has a water absorption rate of 2% or less in accordance with a method of JIS K 7209:2000 A.

According to another aspect of the present invention, a method for producing a light control device includes preparing a light control sheet including a first electrode layer on a first support film, a second electrode layer on a second support film, and a liquid crystal layer between the first and second electrode layers, such that the light control sheet has a sheet edge face formed by an edge face of the first electrode layer, an edge face of the second electrode layer, and an edge face of the liquid crystal layer, forming a structure including a first transparent coating substrate, a second transparent coating substrate, and the light control sheet such that the first and second transparent coating structures sandwich the light control sheet, and forming a transparent adhesive layer which covers the sheet edge face and joins a first bonding surface of the first transparent coating structure and a second bonding surface of the second transparent coating structure around the light control sheet. The liquid crystal layer includes a liquid crystal composition filling voids in a polymer network and spacers dispersed in the liquid crystal layer, and the transparent adhesive layer has a water absorption rate of 2% or less in accordance with a method of JIS K 7209:2000 A.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
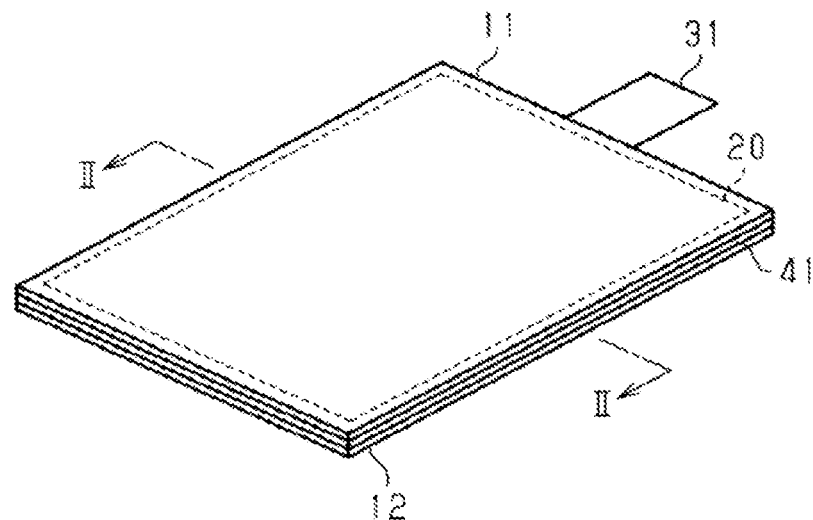
FIG. 1 is a perspective view illustrating the overall configuration of a light control device in an embodiment thereof.

The embodiments will now be described with reference to the accompanying drawings, wherein like reference numerals designate corresponding or identical elements throughout the various drawings.

A description will be given of an embodiment of a light control device and a method for producing the same.

As shown in FIG. 1, the light control device has a rectangular sheet shape. The light control device is attached to a window provided to a moving body such as a vehicle or aircraft. The light control device can be also attached to a window of buildings, such as houses, stations, and airports, partitions in offices, and a display window in stores. Objects to which the light control device is attached may have various shapes such as flat, curved, and indefinite shapes. The light control device is attached to an object with an adhesive layer. The adhesive layer may be composed of any material as long as the layer is transparent and adhesive. An example of the adhesive layer is an OCA (Optical Clear Adhesive) film. The light control device can be made into a geometric shape other than a rectangle, a sheet shape such as an indefinite shape, or a plate shape.

<Light Control Device>

The light control device includes a first transparent coating substrate 11, a second transparent coating substrate 12, a light control sheet 20, a power supply wire 31, and a transparent adhesive layer 41.

The transparent coating substrates 11 and 12 each have the shape of a film. The transparent coating substrates 11 and 12 preferably each have a thickness of 50 μm or more to enhance the waterproofness relative to the light control sheet 20. The transparent coating substrates 11 and 12 preferably each have a thickness of 200 μm or less to ensure that the light control device can be made more light-transmissive and to facilitate joining the light control sheet 20 to each of the transparent coating substrates 11 and 12. The transparent coating substrates 11 and 12 can be each made into a plate shape.

The transparent coating substrates 11 and 12 are colorless and transparent, and thus allow visible light to be transmitted therethrough. The transparent coating substrates 11 and 12 are each made of transparent resin or glass. The transparent coating substrates 11 and 12 can be each made colored and transparent so as to allow part of visible light to be transmitted therethrough.

The transparent coating substrates 11 and 12 each preferably have a water absorption rate of 2% or less to enhance the waterproofness relative to the light control sheet 20. The water absorption rate refers to a value in accordance with the method of JIS K 7209:2000 A.

The resin composing each of the transparent coating substrates 11 and 12 is one selected from the group consisting of polyethylene terephthalate, polyethylene naphthalate, polycarbonate, polypropylene, polystyrene, acrylic resins such as a polymethylmethacrylate or styrene-methacrylic acid copolymer, nylon-based resins such as nylon 6 or nylon 66, and polyurethanes. Polyethylene-terephthalate has a water absorption rate of 0.3%. Polyethylene-naphthalate has a water absorption rate of 0.3%. Polycarbonate has a water absorption rate of 0.2%. Nylon-based resins have a water absorption rate of 1.5% or more and 1.6% or less.

To make the light control sheet 20 more durable against ultraviolet light, the transparent coating substrates 11 and 12 can each contain a UV absorber. The transparent coating substrates 11 and 12 can be each made from resin of a type different from each other.

The light control sheet 20 is located between the first transparent coating substrate 11 and the second transparent coating substrate 12. The entire light control sheet 20 is covered by the first transparent coating substrate 11 as viewed perpendicular to the first transparent coating substrate 11. The entire light control sheet 20 is covered by the second transparent coating substrate 12 as viewed perpendicular to the second transparent coating substrate 12.

The transparent adhesive layer 41 is shaped like a rectangular frame as viewed perpendicular to the second transparent coating substrate 12. The transparent adhesive layer 41 is joined to a periphery of the first bonding surface 11A (see FIG. 2) of the first transparent coating substrate 11. The transparent adhesive layer 41 is joined to a periphery of the second bonding surface 12A (see FIG. 2) of the second transparent coating substrate 12. The transparent adhesive layer 41 is joined to an outer periphery (edge face) of the light control sheet 20 and covers the entire edge face of the light control sheet 20.

The power supply wire 31 is separately connected to a first electrode layer 22M (see FIG. 2) of the light control sheet 20 and to a second electrode layer 23M (see FIG. 2) of the light control sheet 20. The power supply wire 31 includes separate conductive adhesive layers, such as anisotropic conductive films, joined to the respective electrode layers 22M and 23M, and a single flexible printed substrate joined to each conductive adhesive layer. The power supply wire 31 can be modified to include separate conductive paste layers joined to the respective electrode layers 22M and 23M, separate conductive tapes joined to the respective conductive paste layers, and separate leads joined to the respective conductive tapes.

The connection part between the first electrode layer 22M and the power supply wire 31 is covered by the first transparent coating substrate 11. The connection part between the second electrode layer 23M and the power supply wire 31 is covered by the second transparent coating substrate 12. The power supply wire 31 is connected to a drive unit, which is located outside the light control device, and to the light control sheet 20 through a part of the transparent adhesive layer 41. The power supply wire 31 applies a voltage for driving the light control device from a driving device between the first electrode layer 22M and the second electrode layer 23M.

Figure 2:
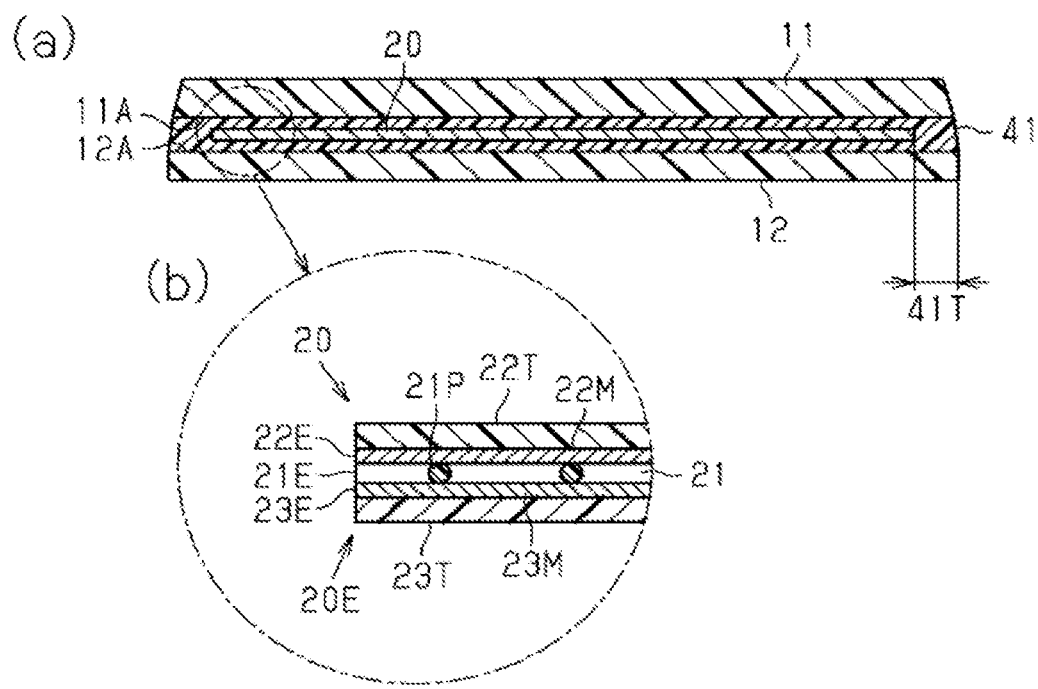
FIG. 2 is a cross-sectional view taken along line II-II of FIG. 1.

As shown in FIG. 2, the first transparent coating substrate 11 includes a first bonding surface 11A. The second transparent coating substrate 12 includes a second bonding surface 12A. The light control sheet 20 is located between the first bonding surface 11A of the first transparent coating substrate 11 and the second bonding surface 12A of the second transparent coating substrate 12. The first bonding surface 11A and the light control sheet 20 are joined together with a transparent adhesive (first transparent adhesive). The second bonding surface 12A and the light control sheet 20 are joined together with a transparent adhesive (second transparent adhesive).

The transparent adhesive layer 41 is joined to the first bonding surface 11A, the second bonding surface 12A, and a sheet edge face 20E of the light control sheet 20 (see the partially enlarged view in FIG. 2). The transparent adhesive that joins the first bonding surface 11A and the light control sheet 20 together and the transparent adhesive that joins the second bonding surface 12A and the light control sheet 20 together are joined to the transparent adhesive layer 41. The transparent adhesive that joins the first bonding surface 11A and the light control sheet 20 together and the transparent adhesive that joins the second bonding surface 12A and the light control sheet 20 together are integrated with the transparent adhesive layer 41. The main components of the transparent adhesive that joins the first bonding surface 11A and the light control sheet 20 together and the transparent adhesive that joins the second bonding surface 12A and the light control sheet 20 together are a type of resin identical to the main component of the transparent adhesive composing the transparent adhesive layer 41. Note that the main component refers to a component of a member having the highest formulation ratio among the components of the member.

The transparent adhesive that joins the first bonding surface 11A and the light control sheet 20 together and the transparent adhesive that joins the second bonding surface 12A and the light control sheet 20 together may not be integrated with the transparent adhesive layer 41. The transparent adhesive that joins the first bonding surface 11A and the light control sheet 20 together, the transparent adhesive that joins the second bonding surface 12A and the light control sheet 20 together, and the transparent adhesive composing the transparent adhesive layer 41 can be resins of a type different from one another. If the main components of the transparent adhesive that joins the first bonding surface 11A and the light control sheet 20 together, the transparent adhesive that joins the second bonding surface 12A and the light control sheet 20 together, and the transparent adhesive composing the transparent adhesive layer 41 are an identical type of resin, then they can be adhered to each other more firmly.

The light control sheet 20 includes a first support film 22T, a first electrode layer 22M, a liquid crystal layer 21, a second support film 23T, and a second electrode layer 23M. The first support film 22T and the first electrode layer 22M constitute a first transparent electrode film. The second support film 23T and the second electrode layer 23M constitute a second transparent electrode film.

The first support film 22T is joined to the first bonding surface 11A via a transparent adhesive. The first support film 22T supports the first electrode layer 22M on a side facing away from the first bonding surface 11A. The second support film 23T is joined to the second bonding surface 12A via a transparent adhesive. The second support film 23T supports the second electrode layer 23M on a side facing away from the second bonding surface 12A.

The support films 22T and 23T are each thinner than each of the transparent coating substrates 11 and 12. The support films 22T and 23T each preferably have a thickness of 20 μm or more to facilitate handling of the light control sheet 20. The support films 22T and 23T each preferably have a thickness of 200 μm or less to ensure that they can be made more light-transparent. The support films 22T and 23T are each colored and transparent, allowing visible light to be partially transmitted, or colorlessly transparent therethrough, allowing visible light to be transmitted therethrough.

The support films 22T and 23T are each made of transparent resin. The resin composing each of the support films 22T and 23T is one selected from the group consisting of polyethylene-terephthalate, polyethylene-naphthalate, polycarbonate, polypropylene, polystyrene, acrylic resin, nylon-based resin, polyurethane, polyethylene, polyvinyl alcohol, polyvinyl chloride, polyimide, polysulfone, cyclo-olefin polymer, and triacetyl cellulose. The resins composing each of the support films 22T and 23T can be of a type different from each other.

The electrode layers 22M and 23M each allow visible light to be transmitted therethrough and are electrically conductive. The electrode layers 22M and 23M are disposed over the entire side surfaces of the support films 22T and 23T, respectively. The electrode layers 22M and 23M each preferably have a thickness of 0.1 μm or more to ensure that they can be made more electrically conductive. The electrode layers 22M and 23M each preferably have a thickness of 10 μm or less to ensure that they can be made more light-transparent.

The electrode layers 22M and 23M are each composed of one type of material selected from the group consisting of indium tin oxide, fluorine-doped tin oxide, tin oxide, zinc oxide, carbon nanotubes, poly(3,4-ethylenedioxythiophene), and a silver alloy thin film.

The liquid crystal layer 21 is located between the first electrode layer 22M and the second electrode layer 23M. The liquid crystal layer 21 fills the entire space between the first electrode layer 22M and the second electrode layer 23M. An edge face of the liquid crystal layer 21 is flush with an edge face of each of the electrode layers 22M and 23M and an edge face of each of the support films 22T and 23T. The liquid crystal layer 21 preferably has a thickness of 10 μm or more to ensure that the liquid crystal layer 21 can be made more opaque. The liquid crystal layer 21 preferably has a thickness of 100 μm or less to ensure that the liquid crystal layer 21 can be made more transparent.

The liquid crystal layer 21 contains a liquid crystal composition. An example of liquid crystal molecules contained in the liquid crystal composition is one selected from the group consisting of those based on Schiff bases, azo types, azoxy types, biphenyls, terphenyls, benzoic acid esters, tolan types, pyrimidines, cyclohexanecarboxylic acid esters, phenylcyclohexanes, and dioxanes. Note that the liquid crystal layer 21 can contain a dye that has a predetermined color and has little influence on how the liquid crystal molecules move based on whether a voltage is applied to the liquid crystal layer 21.

The liquid crystal layer 21 includes a polymer network that fills the entire space between the first electrode layer 22M and the second electrode layer 23M. The liquid crystal composition is held in voids in the polymer network. The type in which the liquid crystal composition is held is one selected from the group consisting of a polymer network type, a polymer dispersion type, and a capsule type. The polymer network type has a three-dimensional mesh polymer network, and holds a liquid crystal composition in voids in the polymer network. The polymer dispersion type has a large number of isolated voids in the polymer network and holds the liquid crystal composition in the voids dispersed in the polymer network. The capsule type holds an encapsulated liquid crystal composition in the polymer network.

The liquid crystal layer 21 includes spacers 21P dispersed all over the liquid crystal layer 21. The spacers 21P have a function of holding the thickness of the liquid crystal layer 21 constant. The spacers 21P are each spherical having an average particle diameter that is substantially equal to the thickness of the liquid crystal layer 21. The spacers 21P are each composed of either transparent inorganic material, such as silicon oxide, or transparent resin material, such as acrylic resin. The spacer 21P preferably has a compressive fracture strength of MPa or more to secure the thickness of the liquid crystal layer 21 when the transparent coating substrates 11 and 12 and the light control sheet 20 are joined together.

The light control sheet 20 may have a functional layer other than the liquid crystal layer 21, the electrode layers 22M and 23M, and the support films 22T and 23T. An example of the functional layer protects the liquid crystal layer 21 and the electrode layers 22M and 23M, such as a gas barrier layer or an ultraviolet barrier layer. The gas barrier layer is located between the support films 22T and 23T and the transparent coating substrates 11 and 12, respectively, or between the support films 22T and 23T and the electrode layers 22M and 23M, respectively.

An example of the functional layer contributes to the control of light transparency, such as an orientation layer or a polarizing layer. The orientation layer is located between each of the electrode layers 22M and 23M and the liquid crystal layer 21. The polarizing layer is located between the support films 22T and 23T and the transparent coating substrates 11 and 12, respectively, or between the support films 22T and 23T and the electrode layers 22M and 23M, respectively.

An example of the functional layer enhances the strength, heat resistance, etc. of the light control sheet 20, such as a hard coat layer. The hard coat layer is located between the support films 22T and 23T and the transparent coating substrates 11 and 12, respectively. In addition, an example of the functional layer enhances inter-layer adhesion in the light control sheet 20.

The type of the light control sheet 20 is either a normal type or a reverse type. The normal type achieves high transmittance by voltage application between the first electrode layer 22M and the second electrode layer 23M. The normal type achieves low transmittance by suspension of voltage application between the first electrode layer 22M and the second electrode layer 23M. In contrast, the reverse type achieves low transmittance by voltage application between the first electrode layer 22M and the second electrode layer 23M. The reverse type achieves high transmittance by suspension of voltage application between the first electrode layer 22M and the second electrode layer 23M.

An edge face of the first transparent coating substrate 11, an edge face of the second transparent coating substrate 12, and an edge face (outer side) of the transparent adhesive layer 41 constitute an edge face of the light control device. The edge face of the light control device is exposed outside the light control device. The edge face of the light control device has a cutting mark. The cutting mark on the edge face of the light control device is a mark that is made when the light control device is cut in a thickness direction thereof with the first transparent coating substrate 11, the second transparent coating substrate 12, and the transparent adhesive layer 41 being as a single unit. An example of the cutting mark extends from the edge face of the first transparent coating substrate 11 to the outer side of the transparent adhesive layer 41. An example of the cutting mark extends from the edge face of the second transparent coating substrate 12 to the outer side of the transparent adhesive layer 41. An example of the cutting mark on the transparent adhesive layer 41 has a line extending in a circumferential direction of the light control device, in a thickness direction of the light control device, or in a direction intersecting with these directions.

The edge face of the light control device is inclined relative to a normal direction of the first bonding surface 11A and to a normal direction of the second bonding surface 12A. The outer side of the transparent adhesive layer 41 may intersect the normal direction of the first bonding surface 11A or the normal direction of the second bonding surface 12A. In the example shown in FIG. 2, the edge face of the light control device is curved, being convex in a direction in which the light control sheet 20 extends. The edge face of the light control device constitutes a hypotenuse of a trapezoid in cross-sectional view of the light control device.

Since the outer side of the transparent adhesive layer 41 has the cutting mark, the thickness thereof can be adjusted by cutting. For example, a transparent adhesive is cured as an edge face of the light control device, and part of the cured material is cut, thereby forming the transparent adhesive layer 41.

The sheet edge face 20E, which serves as an edge face of the light control sheet 20, includes an edge face of each of the support films 22T and 23T, edge faces 22E and 23E of the electrode layers 22M and 23M, and an edge face 21E of the liquid crystal layer 21. The transparent adhesive layer 41 is a cured transparent adhesive that covers the entire sheet edge face 20E. The transparent adhesive layer 41 has a water absorption rate of 2% or less. The water absorption rate of the transparent adhesive layer 41 refers to a value in accordance with the method of JIS K 7209:2000 A. To enhance the waterproofness relative to the light control sheet 20, the first transparent coating substrate 11 and the second transparent coating substrate 12 are preferably joined together by the transparent adhesive layer 41 so as to cover the transparent adhesive layer 41.

The thickness 41T of the transparent adhesive layer 41 in the direction in which the light control sheet 20 extends is preferably 1 mm or more to enhance the waterproofness relative to the light control sheet 20. The minimum thickness 41T of the transparent adhesive layer 41 is preferably 1 mm or more if the thickness 41T thereof is not constant in the thickness direction of the transparent adhesive layer 41.

The thickness 41T of the transparent adhesive layer 41 is preferably 5 mm or less to ensure that the transparent adhesive layer 41 can have better designability as viewed perpendicular to the light control sheet 20. The maximum thickness 41T of the transparent adhesive layer 41 is preferably 5 mm or less if the thickness 41T thereof is not constant in the thickness direction of the transparent adhesive layer 41. In the example shown in FIG. 2, for example, preferably, the part of the transparent adhesive layer 41 having the minimum thickness 41T is in contact with the first transparent coating substrate 11 and has a thickness of 1 mm or more. Preferably, the part of the transparent adhesive layer 41 having the maximum thickness 41T is in contact with the first transparent coating substrate 11 and has a thickness of 5 mm or less.

The main component of the transparent adhesive composing the transparent adhesive layer 41 is one selected from the group consisting of polypropylene, polyurethane, acrylic resins such as a polymethyl methacrylate or styrene-methacrylic acid copolymer, polystyrene-based resins such as polystyrene or a styrene acrylonitrile copolymer or an acrylonitrile-butadiene-styrene copolymer, silicone-based resin, and epoxy-based resin.

Preferably, the main component of the transparent adhesive composing the transparent adhesive layer 41 is an acrylic resin so as to achieve a low molding temperature. The transparent adhesive constituting the transparent adhesive layer 41 is preferably an acrylic resin for its high bending strength and tensile strength in constituting an edge portion of the light control device.

Polypropylene has a water absorption rate of less than 0.01%. Polyurethane has a water absorption rate of less than 0.01%. The acrylic resin has a water absorption rate of 0.2% or more and 0.4% or less. The polystyrene-based resin has a water absorption rate of less than 0.1%. The silicone-based resin has a water absorption rate of 1%. The epoxy resin has a water absorption rate of 2% or less. Cellulose acetate and polyvinyl alcohol cannot be used as the transparent adhesive composing the transparent adhesive layer 41 because cellulose acetate has a water absorption rate of 1.9% or more and 6.5% or less and polyvinyl alcohol has a water absorption rate of 30% or more.

Preferably, the main component of the transparent adhesive composing the transparent adhesive layer 41 is a type of resin identical to the main component of the first transparent coating substrate 11 and the main component of the second transparent coating substrate. If these main components are all an identical type of resin, the transparent adhesive layer 41, the first transparent coating substrate 11, and the second transparent coating substrate can be adhered to each other more firmly.

In the configuration where the transparent adhesive layer 41 joins the first transparent coating substrate 11 and the second transparent coating substrate 12, the transparent coating substrates 11 and 12 are joined together so that the light control sheet 20 is pressed by the first transparent coating substrate 11 and the second transparent coating substrate 12. The transparent coating substrates 11 and 12, joined together by the transparent adhesive layer 41, exert an external force on the light control sheet 20 so that the liquid crystal layer 21 is sandwiched by the first electrode layer 22M and the second electrode layer 23M. This can prevent the layers constituting the light control sheet 20 from separating from each other. In addition, the liquid crystal layer 21 having a polymer network and spacers 21P can prevent a distance between the electrode layers 22M and 23M from varying due to the action of the external force described above.

<Method for Producing Light Control Device>

A method for producing the light control device involves laminating the first transparent coating substrate 11, the second transparent coating substrate 12, and the light control sheet 20 so that the light control sheet 20 is sandwiched by the first transparent coating substrate 11 and the second transparent coating substrate 12. The lamination method is a dry lamination method in which a transparent adhesive is heated and pressed to cure it.

Figure 3:
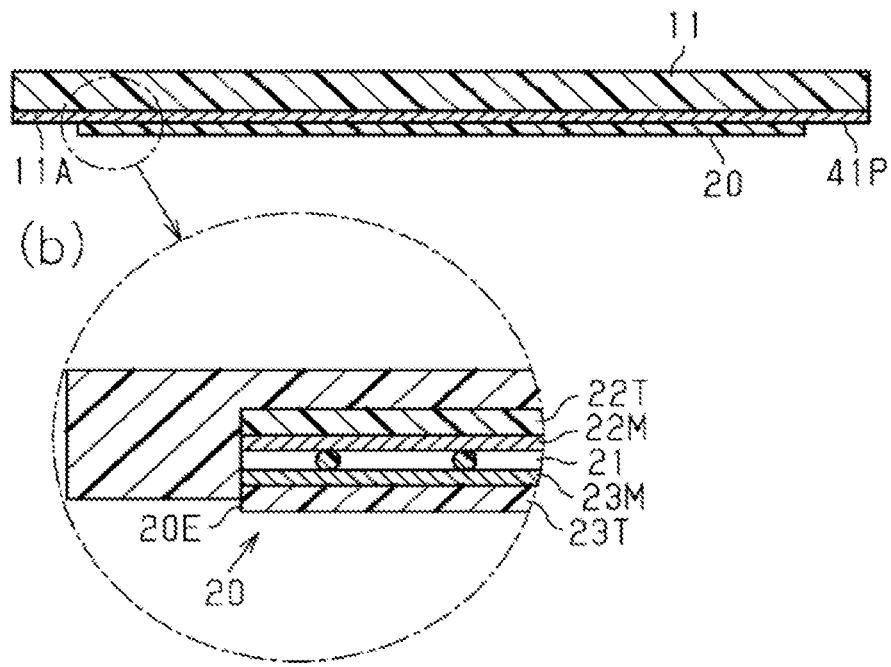
FIG. 3 is a cross-sectional view illustrating a lamination process in a method for producing a light control device.

As shown in FIG. 3, an uncured adhesive layer 41P, the main component of which is a thermosetting transparent adhesive, is initially formed on the first bonding surface 11A of the first transparent coating substrate 11, and then the light control sheet 20 is attached to the uncured adhesive layer 41P. At this time, the light control sheet 20 is attached to the uncured adhesive layer 41P so that the sheet edge face 20E of the light control sheet 20 is mostly covered by the uncured adhesive layer 41P. For example, the light control sheet 20 attached to the uncured adhesive layer 41P exposes only an edge face of a second support film 23T from the uncured adhesive layer 41P.

The light control sheet 20 is cut out of a large sheet with has each of the layers constituting the light control sheet 20, into a desired shape. The sheet edge face 20E of the light control sheet 20 is formed by cutting out from a multilayered sheet. The power supply wire 31 is separately joined to each of the electrode layers 22M and 23M of the light control sheet 20.

The dry lamination method involves first applying an adhesive solution containing a thermosetting transparent adhesive to the first bonding surface 11A of the first transparent coating substrate 11 in formation of the uncured adhesive layer 41P. The adhesive solution is applied onto the first bonding surface 11A with a doctor blade. The film produced by the application of the adhesive solution is dried in a drying device to form the uncured adhesive layer 41P, the main component of which is the transparent adhesive.

The first bonding surface 11A of the first transparent coating substrate 11 may be coated in advance with an adhesion aid to adhere the uncured adhesive layer 41P and the first bonding surface 11A more firmly in advance of the formation of the uncured adhesive layer 41P.

Figure 4:
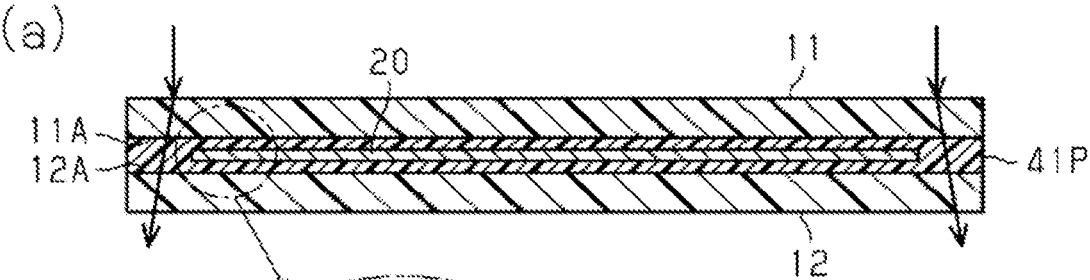
FIG. 4 is a cross-sectional view illustrating a lamination process in the method for producing a light control device.

As shown in FIG. 4, an uncured adhesive layer 41P, the main component of which is a thermosetting transparent adhesive, is then formed on the second bonding surface 12A of the second transparent coating substrate 12, and the light control sheet 20 attached to the first transparent coating substrate 11 is attached thereto together with the first transparent coating substrate 11. At this time, the uncured adhesive layer 41P on the first bonding surface 11A and the uncured adhesive layer 41P on the second bonding surface 12A are joined together so that the entire sheet edge face 20E of the light control sheet 20 is covered by the uncured adhesive layers 41P. The mutually joined uncured adhesive layers 41P form the transparent adhesive layer 41 by curing the uncured adhesive layers 41P and cutting part of the cured material.

Note that in cases where a thermoplastic transparent adhesive is used, a layer composed of a cured transparent adhesive is used instead of the uncured adhesive layer 41P. Then, with the first transparent coating substrate 11 positioned relative to the light control sheet 20, while the first transparent coating substrate 11 is being heated, the layer composed of a softened transparent adhesive is pressed against the light control sheet 20 The pressed first transparent coating substrate 11 is cooled, thereby curing the layer composed of the transparent adhesive. In addition, with the second transparent coating substrate 12 positioned relative to the light control sheet 20, while the second transparent coating substrate 12 is being heated, the layer composed of a softened transparent adhesive is pressed against the light control sheet 20 The pressed second transparent coating substrate 12 is cooled, thereby curing the layer composed of the transparent adhesive so that the entire sheet edge face 20E is covered by the transparent adhesive.

Part of the cured material is cut approximately along a thickness direction of a light control device with the first transparent coating substrate 11, the second transparent coating substrate 12, and the cured material being as a single unit, as indicated by the arrows in FIG. 4. By cutting part of the cured material, the thickness 41T of the transparent adhesive layer 41 is adjusted to, for example, 1 mm or more and 5 mm or less. The cutting is performed such that as a blade for cutting the cured material approaches from the first transparent coating substrate 11 to the second transparent coating substrate 12, the blade moves outward in a direction in which the light control sheet 20 extends. Thus, the edge faces of the light control device each constitute a hypotenuse of a trapezoid in cross-sectional view of the light control device, as shown in FIG. 2.

At this time, the first transparent coating substrate 11 and the second transparent coating substrate 12 are pressed against each other to be joined together. The pressing force that brings the transparent coating substrates 11 and 12 closer to each other is a compressive force created by a roller that sandwiches the transparent coating substrates 11 and 12. Alternatively, when the transparent coating substrates 11 and 12 are joined together under vacuum, the pressing force that brings the transparent coating substrates 11 and 12 closer to each other is a sum of an atmospheric pressure applied to the transparent coating substrates 11 and 12 and an air pressure created by compressed air. In a dry lamination method, for example, a roller applies a pressing force of approximately 0.7 MPa to the transparent coating substrates 11 and 12. When the transparent coating substrates 11 and 12 are joined together under vacuum, for example, a pressing force of 0.2 MPa or more and 0.5 MPa or less is applied thereto.

The pressing force described above also acts on the light control sheet 20 located between the first transparent coating substrate 11 and the second transparent coating substrate 12. A change in the distance between the first electrode layer 22M and the second electrode layer 23M changes a capacitance and other electrical properties of the liquid crystal layer 21. Particularly in the liquid crystal layer 21, where a polymer network is formed between the first electrode layer 22M and the second electrode layer 23M, the distance between the first electrode layer 22M and the second electrode layer 23M is determined by formation of the liquid crystal layer 21. If the pressing force described above additionally acts on the light control sheet 20, the distance therebetween readily changes.

A compressive fracture strength of 1 MPa or more of the spacers 21P is sufficiently higher than the pressing force applied to the transparent coating substrates 11 and 12. This means that the liquid crystal layer 21 can maintain its thickness at an average particle diameter of the spacers 21P even if the pressing force described above is applied in the process of producing the light control device.

Test Examples

A normal type light control sheet 20 was prepared with the support films 22T and 23T, the electrode layers 22M and 23M, and the liquid crystal layer 21 being configured as listed below. The light control device in a test example was then prepared using a dry lamination method with the transparent coating substrates 11 and 12 and the transparent adhesive layer 41 being configured as listed below.

Support films 22T and 23T: Polyethylene-terephthalate films
Support film thickness: 50 μm
Electrode layers 22M and 23M: Indium tin oxide
Thickness of electrode layers 22M and 23M: 0.3 μm
Thickness of liquid crystal layer 21: 20 μm
Transparent coating substrates 11 and 12: Acrylic resin films
Thickness of transparent coating substrate: 100 μm
Spacer 21P: Acrylic resin particles
Average particle diameter of spacer 21P: 20 μm
Transparent adhesive layer 41: Acrylic resin A water immersion test was conducted in accordance with JIS C 0920 2003 (IPX7) with the light control device of the test example to check its operation with and without application of a driving voltage, to conduct visual observation for water penetration into the light control device, and to measure a haze value of the light control device before and after the test in a state in which a driving voltage is applied (in the transparent state). After the test, the light control device of the test example was observed to operate in the same manner as before the test, to allow no water penetration under visual observation, and to increase in haze value by less than 2%.

Similar results were obtained when the transparent adhesive layer 41 was composed of polypropylene, polyurethane, polystyrene resin, silicone-based resin, and epoxy resin. When the transparent adhesive layer 41 was composed of cellulose acetate or polyvinyl alcohol, on the other hand, visual observation after the test found water penetration from the sheet edge face 20E into the light control sheet 20 and presence of an area that was made transparent and an area that was insensitive to application of driving voltage at an edge portion of the liquid crystal layer 21.

According to the present embodiment, the advantageous effects listed below can be achieved.

(1) The light control sheet 20 is located between the first transparent coating substrate 11 and the second transparent coating substrate 12, which enhances the waterproofness relative to the liquid crystal layer 21 on a first electrode layer 22M side relative to the liquid crystal layer 21 and on a second electrode layer 23M side relative thereto. In addition, the transparent adhesive layer 41, which enhances the waterproofness, is transparent, thus preventing deterioration in designability when the transparent adhesive layer 41 is visually recognized.

(2) In addition, the sheet edge face 20E including an edge face of the liquid crystal layer 21 is covered by the transparent adhesive layer 41 whose water absorption rate is 2% or less, which enhances the waterproofness relative to the edge face of the liquid crystal layer 21.

(3) The transparent coating substrates 11 and 12 each exert an external force on the light control sheet 20 so that the liquid crystal layer 21 is sandwiched by the first electrode layer 22M and the second electrode layer 23M. This can prevent the layers constituting the light control sheet 20 from separating from each other.

(4) In addition, the liquid crystal layer 21 having a polymer network and spacers 21P can prevent a distance between the electrode layers 22M and 23M from varying due to an action of the external force.

(5) A compressive fracture strength of MPa or more of the spacers 21P makes it possible to readily employ the method for pressing the light control sheet 20 between the transparent coating substrates 11 and 12 for producing the light control device.

(6) A thickness 41T of 1 mm or more of the transparent adhesive layer 41 enhances the waterproofness relative to the liquid crystal layer 21. A thickness 41T of 5 mm or less of the transparent adhesive layer 41 makes it possible to maintain the designability of the light control unit.

(7) If the outer side of the transparent adhesive layer 41 has a cutting mark, cutting the transparent adhesive layer 41 can adjust the thickness and shape thereof.

(8) If the main components of the transparent coating substrates 11 and 12 and the transparent adhesive layer 41 are an identical type of resin, they can be joined more firmly.

(9) If the main component of each transparent adhesive is an identical type of resin, this enhances the waterproofness relative to each part covered by the cured material of the transparent adhesive. In addition, the same transparent adhesive may be used as the respective transparent adhesives, which simplifies the light control device and the production method thereof.

(10) If the connection parts between the electrode layers 22M and 23M and the power supply wire 31 are covered by the transparent coating substrates 11 and 12 via a transparent adhesive, this enhances the waterproofness relative to the connection parts.

(11) If the main components of the transparent adhesive for joining the support films 22T and 23T to the bonding surfaces 11A and 12A, the transparent adhesives for covering the connection parts, and the transparent adhesive for forming the transparent adhesive layer 41 are an identical type of resin, the same transparent adhesive may be used as the respective transparent adhesives. This in turn simplifies the light control unit and the production method thereof (Modification)

Figure 5:
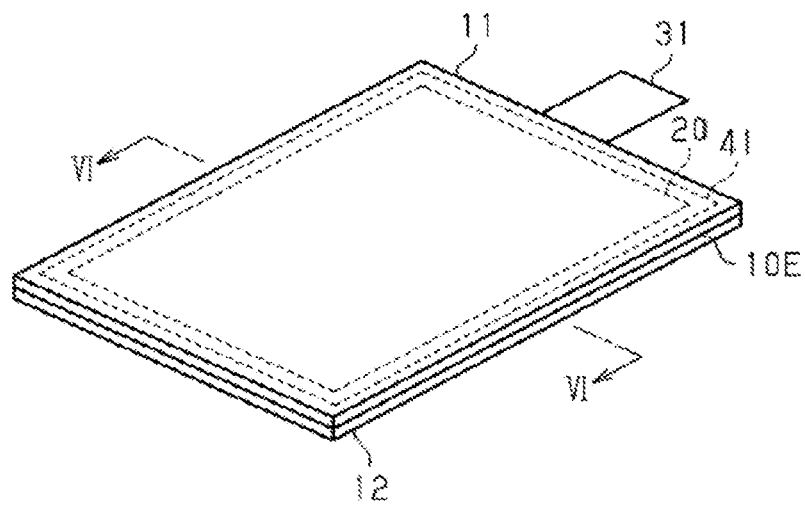
FIG. 5 is a perspective view illustrating the overall configuration of a light control device according to a modification.
Figure 6:
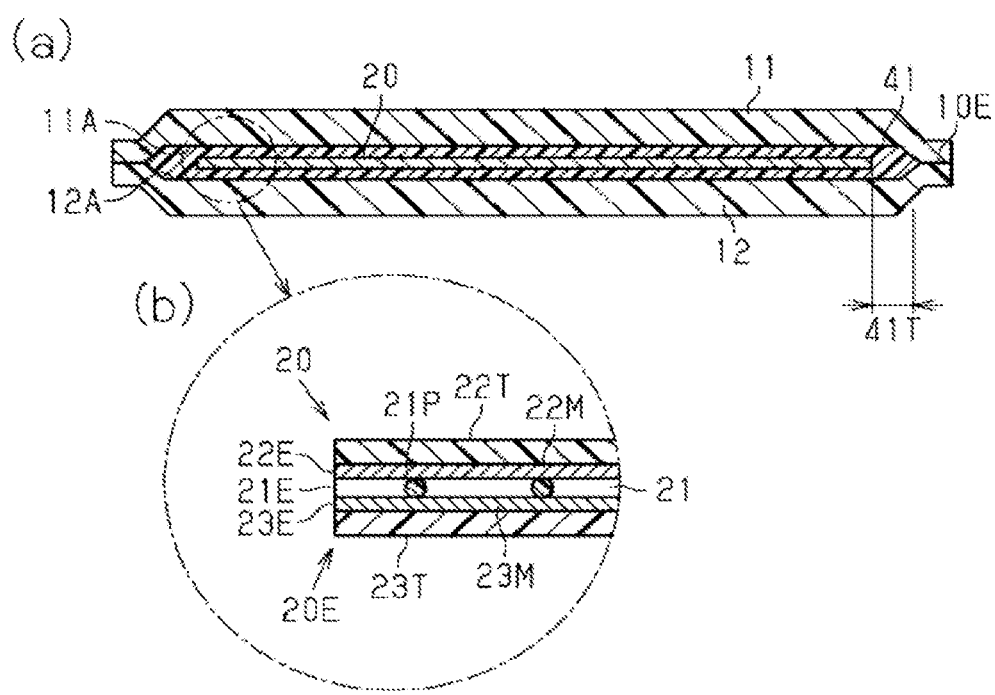
FIG. 6 is a cross-sectional view taken along line VI-VI of FIG. 5.

The above embodiment may be implemented with modifications as described below:

As shown in FIG. 5, the transparent adhesive layer 41 may be located around the light control sheet 20, and an edge portion of the first transparent coating substrate 11 and an edge portion of the second transparent coating substrate 12 may be joined together so as to cover the transparent adhesive layer 41. In other words, the transparent adhesive layer 41 joins the sheet edge face 20E and the bonding surfaces 11A and 12A around the light control sheet 20, as shown in FIG. 6. The edge portion of the first transparent coating substrate 11 and the edge portion of the second transparent coating substrate 12 are joined together outside the transparent adhesive layer 41 so as to cover an edge face of the transparent adhesive layer 41.

The method for producing the light control device in this modification involves laminating the first transparent coating substrate 11, the second transparent coating substrate 12, and the light control sheet 20 so that the light control sheet 20 is sandwiched by the first transparent coating substrate 11 and the second transparent coating substrate 12, as with the embodiment described above. On the other hand, the uncured adhesive layer 41P formed on the first bonding surface 11A of the first transparent coating substrate 11 and the uncured adhesive layer 41P formed on the second bonding surface 12A of the second transparent coating substrate 12 are sufficiently thinner on the edge portion of the first transparent coating substrate 11 and on the edge portion of the second transparent coating substrate 12 than in other places. Joining the transparent coating substrates 11 and 12 together on the edge portions thereof exerts a pressing force thereon which is greater than those exerted when they are joined together in other places.

(12) This modification enables a joint portion 10E between the first transparent coating substrate 11 and the second transparent coating substrate 12 to further enhance the waterproofness relative to the edge face of the liquid crystal layer 21.

(13) The joining of the transparent coating substrates 11 and 12 can prevent the layers constituting the light control sheet from separating from each other.

Figure 7:
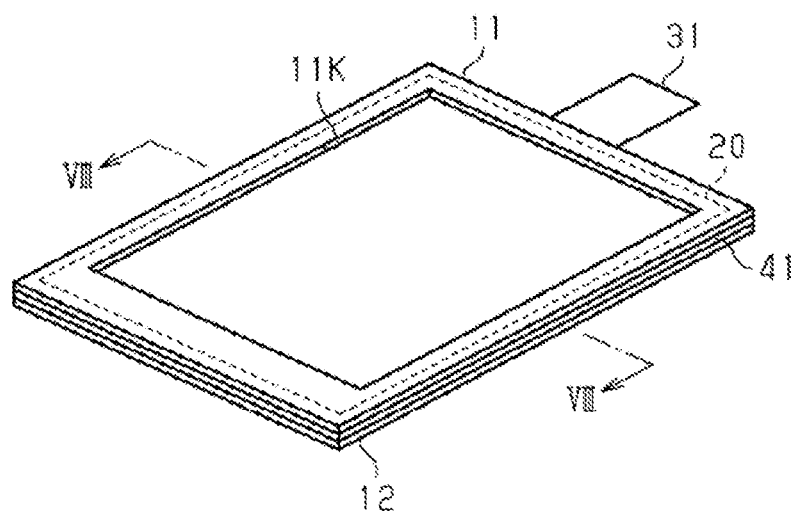
FIG. 7 is a perspective view illustrating the overall configuration of a light control device according to a modification.
Figure 8:
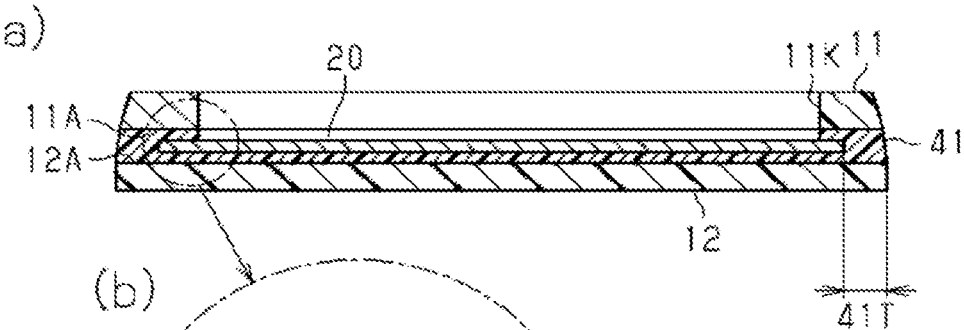
FIG. 8 is a cross-sectional view taken along line VIII-VIII of FIG. 7.
Figure 8:
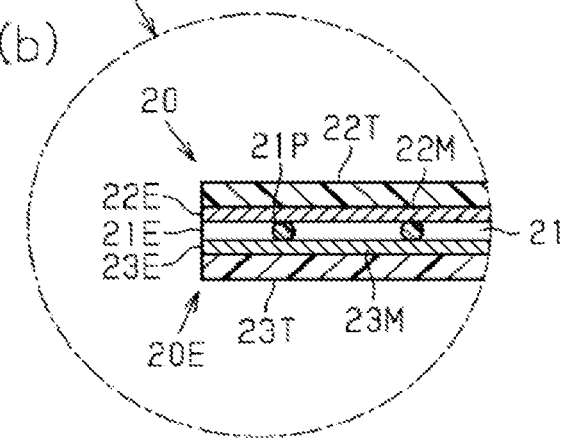

As shown in FIG. 7, the first transparent coating substrate 11 may have an opposite surface facing away from the first bonding surface 11A and may further have an opening 11K that extends between the first bonding surface 11A and the opposite surface. The opening 11K is rectangular as viewed perpendicular to the first transparent coating substrate 11. As shown in FIG. 8, the opening 11K extends from the opposite surface of the first transparent coating substrate 11 through a surface of the light control sheet 20. The opening 11K faces an area of the light control sheet 20 surrounded by the sheet edge face 20E.

The method for producing the light control device in this modification involves laminating the first transparent coating substrate 11, the second transparent coating substrate 12, and the light control sheet 20 so that the light control sheet 20 is sandwiched by the first transparent coating substrate 11 and the second transparent coating substrate 12, as with the embodiment described above. A part of the first transparent coating substrate 11 and the transparent adhesive that joins the first bonding surface 11A and the light control sheet 20 are then cut so as to provide a border of the opening 11K.

(14) This modification exposes a part of the light control sheet 20 from the first transparent coating substrate 11, which can prevent deterioration in light transmittance caused by the transparent adhesive located between the first transparent coating substrate 11 and the light control sheet 20, and the first transparent coating substrate 11.

The light control device may have a different configuration in which the power supply wire 31 is omitted and the entire periphery of the light control sheet 20 is covered by the transparent adhesive layer 41. In this case, the electrode layers 22M and 23M and the power supply wire 31 are connected together by removing part of the transparent coating substrates 11 and 12 and the transparent adhesives from the light control device during the process of attaching the light control device to a target object.

The present application addresses the following. The environment in which the light control sheet is located is not limited to a dry atmosphere having a low relative humidity, but is increasingly often a humid atmosphere having a high relative humidity. A light control sheet located in a humid atmosphere is subject to a decline in the function of altering the light transmittance when the liquid crystal layer becomes wet.

The present invention has an aspect to provide a light control device that enhances the waterproofness relative to the liquid crystal layer and a method for producing the same.

A light control device described above includes a first transparent coating substrate having a first bonding surface, a second transparent coating substrate having a second bonding surface, and a light control sheet located between the first bonding surface and the second bonding surface. The light control sheet includes a first transparent electrode film, a second transparent electrode film, and a liquid crystal layer. The first transparent electrode film includes a first electrode layer and a first support film that supports the first electrode layer, with the first support film joined to the first bonding surface via a first transparent adhesive. The second transparent electrode film includes a second electrode layer and a second support film that supports the second electrode layer, with the second support film joined to the second bonding surface via a second transparent adhesive. The liquid crystal layer has a liquid crystal composition that fills the space between the first transparent electrode film and the second transparent electrode film. An edge face of the first electrode layer, an edge face of the second electrode layer, and an edge face of the liquid crystal layer constitute a sheet edge face. The light control device further includes a transparent adhesive layer covering the sheet edge face, and joining the first bonding surface and the second bonding surface together around the light control sheet, the transparent adhesive layer having a water absorption rate of 2% or less in accordance with the method of JIS K 7209:2000 A.

A method for producing the light control device for solving the problem described above includes preparing a light control sheet having a liquid crystal layer containing a liquid crystal composition that fills voids of a polymer network and spacers dispersed in the liquid crystal layer. In the light control sheet, the liquid crystal layer is located between a first electrode layer supported by a first support film and a second electrode layer supported by a second support film. In the light control sheet, an edge face of the first electrode layer, an edge face of the second electrode layer, and an edge face of the liquid crystal layer constitute a sheet edge face. The method for producing this light control device includes laminating a first transparent coating substrate, a second transparent coating substrate, and the light control sheet so that the light control sheet is sandwiched by the first transparent coating substrate and the second transparent coating substrate, and covering the sheet edge face with a transparent adhesive layer and joining a first bonding surface and a second bonding surface with the transparent adhesive layer around the light control sheet, the transparent adhesive layer having a water absorption rate of 2% or less in accordance with the method of JIS K 7209: 2000 A.

According to the configuration described above, the light control sheet is located between the first transparent coating substrate and the second transparent coating substrate, which enhances the waterproofness relative to the liquid crystal layer both on a first electrode layer side relative to the liquid crystal layer and on a second electrode layer side relative thereto. In addition, the sheet edge face including the edge face of the liquid crystal layer is covered by the transparent adhesive layer whose water absorption rate is 2% or less, which enhances the waterproofness relative to the edge face of the liquid crystal layer. As with each transparent coating substrate, the transparent adhesive layer, which enhances the waterproofness, is also transparent, thus preventing deterioration in designability when the transparent adhesive layer is visually recognized.

In the configuration where the transparent adhesive layer joins the first transparent coating substrate and the second transparent coating substrate together, the first and second transparent coating substrates are joined to each other so that the light control sheet is pressed by these substrates. The respective transparent coating substrates joined to each other by the transparent adhesive layer exert an external force on the light control sheet so that the first and second electrode layers press the liquid crystal layer. This can in turn prevent the layers constituting the light control sheet from separating from each other. In addition, the liquid crystal layer having a polymer network and spacers can prevent a distance between the electrode layers from varying due to an action of the external force described above.

In the light control device described above, the transparent adhesive layer may have a thickness of 1 mm or more and 5 mm or less in a direction in which the light control sheet extends. According to this configuration, the transparent adhesive layer has a thickness of 1 mm or more, which further enhances the waterproofness relative to the liquid crystal layer. In addition, the thickness of 5 mm or less of the transparent adhesive layer can sufficiently keep small an area occupied by the transparent adhesive layer as viewed perpendicular to the light control sheet, thereby making it possible to maintain the designability of the light control device.

In the light control device described above, the liquid crystal layer may have spacers dispersed therein, and the compressive fracture strength of the spacers may be 1 MPa or more. The compressive fracture strength of 1 MPa or more of the spacers can prevent the distance between the electrode layers from varying as long as the light control sheet is pressed with a force of less than 1 MPa. For example, a method of pressing a light control sheet between transparent coating substrates is readily employed for producing a light control device.

In the light control device described above, the transparent adhesive layer may be located around the light control sheet, and an edge portion of the first transparent coating substrate and an edge portion of the second transparent coating substrate may be joined to each other so as to cover the transparent adhesive layer on a side opposite to the light control sheet. According to this configuration, a transparent adhesive layer is located around the light control sheet, and additionally, the joint portion between the edge portion of the first transparent coating substrate and the edge portion of the second transparent coating substrate is located around the transparent adhesive layer. The joint portion between the edge portion of the first transparent adhesive layer and the edge portion of the second transparent adhesive layer further enhances the waterproofness relative to the liquid crystal layer. In addition, the joining of the transparent coating substrates can further prevent the layers constituting the light control sheet from separating from each other.

In the light control device described above, the transparent adhesive layer may include an inner side facing the sheet edge face and an outer side exposed to the outside of the light control device in the direction in which the light control sheet extends, and the outer side may include a cutting mark contiguous to the edge face of each transparent coating substrate. According to this configuration, the outer side of the transparent adhesive layer has a cutting mark, so that the thickness and shape thereof can be adjusted by cutting. For example, a transparent adhesive is cured on an edge face of a liquid crystal layer and the like, and part of the cured material of the transparent adhesive is cut, thereby forming a transparent adhesive layer.

In the light control device described above, the main components of the first transparent coating substrate, the second transparent coating substrate, and the transparent adhesive layer may be an identical type of resin. This configuration can join the first transparent coating substrate and the transparent adhesive layer together more firmly because the main components of the first transparent coating substrate and the transparent adhesive layer are an identical type of resin. In addition, the second transparent coating substrate and the transparent adhesive layer can be also joined more firmly because the main components of the second transparent coating substrate and the transparent adhesive layer are an identical type of resin. The joining of the transparent adhesive layer and each bonding surface can prevent the layers constituting the light control sheet from separating from each other.

In the light control device described above, the main components of the first transparent adhesive, the second transparent adhesive, and a transparent adhesive composing the transparent adhesive layer may be an identical type of resin.

In the above-described method for producing the light control device, the laminating may include joining the first support film to the first transparent coating substrate via a first transparent adhesive, and joining the second support film to the second transparent coating substrate via a second transparent adhesive. The covering the sheet edge face may include forming the transparent adhesive layer by covering the sheet edge face with the first and second transparent adhesives and curing the first and second transparent adhesives.

These configurations enhance the waterproofness relative to each part covered by the cured material of the transparent adhesive because each transparent adhesive has an identical type of resin as its main component. In addition, the same transparent adhesive may be used as the respective transparent adhesives, which simplifies the light control device and the production method thereof.

In the light control described above, the first transparent coating substrate may include an opposite surface facing away from the first bonding surface and additionally include an opening that extends between the first bonding surface and the opposite surface. The opening may face an area of the light control sheet surrounded by the sheet edge face. According to this configuration, a part of the light control sheet is exposed from the transparent coating substrate, which makes it possible to prevent the first transparent coating substrate from lowering the light transmittance.

The light control device described above may further include a power supply wire connected to the first electrode layer. A connection part at which the first electrode layer and the power supply wire are connected to each other may be covered by the first transparent coating substrate via the first transparent adhesive. This configuration enhances the waterproofness relative to the connection part. In addition, the same transparent adhesive may be used as the transparent adhesive that joins the first support film to the first bonding surface and the transparent adhesive that covers the connection part, which simplifies the light control device and the production method thereof.

The embodiments of the present invention enhances the waterproofness relative to a liquid crystal layer.

REFERENCE SIGNS LIST

11: First transparent coating substrate
11A: First bonding surface

11K: Opening
12: Second transparent coating substrate
12A: Second bonding surface
20: Light control sheet
20E: Sheet edge face
21: Liquid crystal layer
21P: Spacer
22E, 23E: Edge face
22M: First electrode layer
22T: First support film
23M: Second electrode layer
23T: Second support film
31: Power supply wire
41: Transparent adhesive layer
41P: Uncured adhesive layer Obviously, numerous modifications and variations of the present invention are possible in light of the above teachings. It is therefore to be understood that within the scope of the appended claims, the invention may be practiced otherwise than as specifically described herein.

What is claimed is:

1. A light control device, comprising:
    a first transparent coating substrate having a first bonding surface;
    a second transparent coating substrate having a second bonding surface;
    a light control sheet positioned between the first bonding surface of the first transparent coating substrate and the second bonding surface of the second transparent coating substrate; and
    a transparent adhesive layer joining the first bonding surface of the first transparent coating substrate and the second bonding surface of the second transparent coating substrate together around the light control sheet,
    wherein the light control sheet includes a first transparent electrode film, a second transparent electrode film, and a liquid crystal layer including a liquid crystal composition such that the liquid crystal composition is filling space between the first transparent electrode film and the second transparent electrode film, the first transparent electrode film includes a first support film and a first electrode layer formed on the first support film joined to the first bonding surface via a first transparent adhesive, the second transparent electrode film includes a second support film and a second electrode layer formed on the second support film joined to the second bonding surface via a second transparent adhesive, the light control sheet has a sheet edge face formed by an edge face of the first electrode layer, an edge face of the second electrode layer, and an edge face of the liquid crystal layer, the first transparent adhesive, the second transparent adhesive, and the transparent adhesive layer include an identical resin as a main component, and the transparent adhesive layer covers the sheet edge face and has a water absorption rate of 2% or less in accordance with a method of JIS K 7209:2000.

2. The light control device according to claim 1, wherein the transparent adhesive layer has a thickness in a range of 1 mm to 5 mm in a direction in which the light control sheet extends.

3. The light control device according to claim 1, wherein the liquid crystal layer has a plurality of spacers dispersed in the liquid crystal layer, and the spacers have a compressive fracture strength of 1 MPa or more.

4. The light control device according to claim 1, wherein the transparent adhesive layer is formed around the light control sheet, and the first and second transparent coating substrates are formed such that an edge portion of the first transparent coating substrate and an edge portion of the second transparent coating substrate are joined together, and that the first and second transparent coating substrates cover the transparent adhesive layer on a side opposite to the light control sheet.

5. The light control device according to claim 1, wherein the transparent adhesive layer comprises an inner side facing the sheet edge face and an outer side exposed to an outside of the light control device in a direction in which the light control sheet extends, and the outer side comprises a cutting mark contiguous to an edge face of each of the first and second transparent coating substrates.

6. The light control device according to claim 1, wherein the first transparent coating substrate, the second transparent coating substrate, and the transparent adhesive layer include an identical resin as a main component.

7. The light control device according to claim 1, wherein the first transparent adhesive and the second transparent adhesive are integrally formed with the transparent adhesive layer.

8. The light control device according to claim 1, wherein the first transparent coating substrate has an opposite surface facing away from the first bonding surface and has an opening which extends between the first bonding surface and the opposite surface such that the opening is exposing an area of the light control sheet surrounded by the sheet edge face.

9. The light control device according to claim 1, further comprising:
    a power supply wire connected to the first electrode layer,
    wherein the first transparent coating substrate covers, via the first transparent adhesive, a portion where the first electrode layer and the power supply wire are connected to each other.

10. A method for producing a light control device, comprising:
    preparing a light control sheet including a first electrode layer on a first support film, a second electrode layer on a second support film, and a liquid crystal layer between the first and second electrode layers, such that the light control sheet has a sheet edge face formed by an edge face of the first electrode layer, an edge face of the second electrode layer, and an edge face of the liquid crystal layer;
    forming a structure including a first transparent coating substrate, a second transparent coating substrate, and the light control sheet such that the first and second transparent coating structures sandwich the light control sheet; and
    forming a transparent adhesive layer which covers the sheet edge face and joins a first bonding surface of the first transparent coating structure and a second bonding surface of the second transparent coating structure around the light control sheet,
    wherein the liquid crystal layer includes a liquid crystal composition filling voids in a polymer network and a plurality of spacers dispersed in the liquid crystal layer, the forming of the structure includes joining the first support film to the first transparent coating substrate via a first transparent adhesive and joining the second support film to the second transparent coating substrate via a second transparent adhesive, the first transparent adhesive, the second transparent adhesive, and the transparent adhesive layer include an identical resin as a main component, and the transparent adhesive layer has a water absorption rate of 2% or less in accordance with a method of JIS K 7209:2000.

11. The method according to claim 10, wherein the covering of the sheet edge face includes forming the transparent adhesive layer such that the sheet edge face is covered with the first and second transparent adhesives and curing the first and second transparent adhesives.

12. The light control device according to claim 1, wherein the first transparent coating substrate comprises a resin, and the second transparent coating substrate comprises a resin.

13. The light control device according to claim 1, wherein the first transparent adhesive and the second transparent adhesive are not integrally formed with the transparent adhesive layer.

14. The light control device according to claim 1, wherein the main component of the transparent adhesive layer is one selected from polypropylene, polyurethane, an acrylic resin, a polystyrene-based resin, a silicone-based resin, and an epoxy-based resin.

15. The light control device according to claim 1, wherein the main component of the transparent adhesive layer is an acrylic resin.

16. The light control device according to claim 7, wherein the first transparent coating substrate comprises a resin, and the second transparent coating substrate comprises a resin.

17. The light control device according to claim 12, wherein the first transparent adhesive and the second transparent adhesive are not integrally formed with the transparent adhesive layer.

18. The light control device according to claim 7, wherein the main component of the transparent adhesive layer is one selected from polypropylene, polyurethane, an acrylic resin, a polystyrene-based resin, a silicone-based resin, and an epoxy-based resin.

19. The light control device according to claim 12, wherein the main component of the transparent adhesive layer is one selected from polypropylene, polyurethane, an acrylic resin, a polystyrene-based resin, a silicone-based resin, and an epoxy-based resin.

20. The light control device according to claim 7, wherein the main component of the transparent adhesive layer is an acrylic resin.

* * * * *